(12) United States Patent
Xu et al.

(10) Patent No.: US 11,643,881 B2
(45) Date of Patent: May 9, 2023

(54) COMPOSITE SHOCK ABSORBER FOR POLYCRYSTALLINE DIAMOND COMPACT BIT

(71) Applicant: Northeast Petroleum University, Daqing (CN)

(72) Inventors: Jinchao Xu, Daqing (CN); Wei Li, Daqing (CN); Siqi Li, Daqing (CN); Jingming Gai, Daqing (CN); Wenfeng Sun, Daqing (CN); Huan Zhao, Daqing (CN)

(73) Assignee: NORTHEAST PETROLEUM UNIVERSITY, Daqing (CN)

( * ) Notice: Subject to any disclaimer, the term of this patent is extended or adjusted under 35 U.S.C. 154(b) by 109 days.

(21) Appl. No.: 17/377,862

(22) Filed: Jul. 16, 2021

(65) Prior Publication Data

US 2021/0363835 A1 Nov. 25, 2021

Related U.S. Application Data

(63) Continuation of application No. PCT/CN2020/128906, filed on Nov. 16, 2020.

(30) Foreign Application Priority Data

May 22, 2020 (CN) .......................... 202010443192.9

(51) Int. Cl.
*E21B 17/07* (2006.01)
*E21B 4/14* (2006.01)
(Continued)

(52) U.S. Cl.
CPC .............. *E21B 17/076* (2013.01); *E21B 4/14* (2013.01); *F16F 1/16* (2013.01); *F16F 1/32* (2013.01); *E21B 10/567* (2013.01)

(58) Field of Classification Search
CPC ............................... E21B 17/07; E21B 17/076
See application file for complete search history.

(56) References Cited

U.S. PATENT DOCUMENTS

| 4,552,230 A | * | 11/1985 | Anderson | ................ E21B 17/07 |
| | | | | 175/321 |
| 5,188,191 A | * | 2/1993 | Tomek | ....................... F16F 1/40 |
| | | | | 175/321 |

(Continued)

*Primary Examiner* — Kipp C Wallace
(74) *Attorney, Agent, or Firm* — WPAT, P.C.

(57) ABSTRACT

The invention relates to a composite shock absorber for a polycrystalline diamond compact bit, comprising a drilling tool body having a water inlet, an impact body having a water outlet and forming a shock absorption cavity, a disc spring group having an annular pressing sleeve, a cylindrical torsion bar spring which has an external thread and a spline, is connected to the drilling tool body through threads and extended into an impactor and connected thereto through the spline, and the annular pressing sleeve, wherein bit vibration impact force is transmitted therebetween through a torsion transmission joint, and a bearing group is arranged between the lower end surface of the annular pressing sleeve and an annular step of the impact body. The composite shock absorber can weaken damage of the slippage effect to polycrystalline diamond compact cutting teeth, absorb axial vibration from a drill stem and prolong the service life of the bit.

3 Claims, 5 Drawing Sheets

(51) Int. Cl.
*F16F 1/32* (2006.01)
*F16F 1/16* (2006.01)
*E21B 10/567* (2006.01)

(56) References Cited

U.S. PATENT DOCUMENTS

| | | | | |
|---|---|---|---|---|
| 6,098,726 | A * | 8/2000 | Taylor | E21B 17/076 |
| | | | | 175/320 |
| 6,308,940 | B1 * | 10/2001 | Anderson | E21B 17/073 |
| | | | | 175/300 |
| 6,338,390 | B1 * | 1/2002 | Tibbitts | E21B 28/00 |
| | | | | 175/381 |
| 6,543,556 | B1 * | 4/2003 | Anderson | E21B 31/107 |
| | | | | 175/320 |
| 2009/0023502 | A1 * | 1/2009 | Koger | E21B 17/07 |
| | | | | 175/57 |
| 2012/0205158 | A1 * | 8/2012 | Barnes | E21B 17/076 |
| | | | | 175/57 |
| 2015/0376959 | A1 * | 12/2015 | Dinica | E21B 17/07 |
| | | | | 175/56 |
| 2017/0204684 | A1 * | 7/2017 | Cravatte | E21B 17/073 |

* cited by examiner

COMPOSITE SHOCK ABSORBER FOR POLYCRYSTALLINE DIAMOND COMPACT BIT

CROSS REFERENCE TO RELATED APPLICATION

The invention relates to the technical field of petroleum drilling, in particular to a composite shock absorber for a polycrystalline diamond compact bit.

BACKGROUND OF THE INVENTION

A polycrystalline diamond compact bit is widely used in petroleum drilling and other fields. A polycrystalline diamond compact composite sheet welded on the polycrystalline diamond compact bit has a very strong anti-abrasive ability, but its impact resistance is its fatal weakness. During the drilling process, the polycrystalline diamond compact bit should be able to cut rocks continuously and stably under the normal state, which does not exist in actual drilling. The movement of the polycrystalline diamond compact bit downhole is extremely disordered, including lateral and axial vibration and the combination thereof, which can easily damage the polycrystalline diamond compact cutting teeth of the bit to damage the bit, thereby affecting the service life of the bit, and increasing the drilling cost. Statistics show that this type of damage accounts for 80% of polycrystalline diamond compact bit failures in drilling operations.

SUMMARY OF THE INVENTION

The objective of the invention is to provide a composite shock absorber for a polycrystalline diamond compact bit, which is used to overcome the problem of polycrystalline diamond compact bit damage caused by the instantaneous impact of the polycrystalline diamond compact diamond composite bit during drilling operations.

To solve the technical problem, the invention adopts the following technical scheme: a composite shock absorber for a polycrystalline diamond compact bit includes a drilling tool body, an impact body, a disc spring group, a torsion bar spring and an annular pressing sleeve, where bit vibration impact force is transmitted between the drilling tool body and the impact body through a torsion transmission joint, the impact body is arranged at the lower end of the drilling tool body and forms a shock absorption cavity; the drilling tool body is provided with a water inlet; the impact body is provided with a water outlet; the torsion bar spring is a cylindrical body, provided with an external thread and a spline at upper and lower ends thereof separately, connected to the drilling tool body in a threaded mode, extended into an impactor and connected thereto through the spline at the upper end and lower end thereof, and positioned in the shock absorption cavity; the disc spring group sleeves outside the torsion bar spring, the annular pressing sleeve is arranged at the lower end of the disc spring group; a bearing group is arranged between the lower end surface of the annular pressing sleeve and an annular step, in the drilling tool body, of the impact body; a sealing ring is arranged between the sealing shaft section at the lower end of the torsion bar spring and the inner wall of the impact body, and a sealing ring is also arranged between the outer wall of the impact body and the drilling tool body.

In the scheme, a spline slot which is matched with the spline is formed in the inner wall of the impact body.

In the scheme, the axial vibration of the impact body is transmitted to the disc spring group through the annular pressing sleeve and the bearing group to achieve axial vibration absorption. At the same time, the axial and radial movement of the bit is decomposed by the bearing group. The spline on the torsion bar spring is transferred to the torsion bar spring to achieve vibration absorption in the torsion direction.

The invention has the following beneficial effects:

The invention uses a torsion bar spring to absorb the vibration and impact of the polycrystalline diamond compact bit in the torsion direction, reduce the damage to the polycrystalline diamond compact cutting teeth by the slippage effect and also is equipped with an axial thrust disc spring group in the axial direction to absorb the axial vibration from the drill stem; and in use, the bit can be operated more effectively with a long service life, so that the effect of increasing the drilling speed and extending the footage is achieved.

In the figures: 1. drilling tool body; 2. water inlet; 3. threaded section; 4. disc spring group; 5. torsion bar spring; 6. annular pressing sleeve; 7. spline; 8. bearing group; 9. sealing slot; 10. sealing ring; 11. sealing shaft section; 12. torsion transmission joint; 13. water outlet; and 14. impact body.

DETAILED DESCRIPTION OF THE PREFERRED EMBODIMENTS

Figure 1:
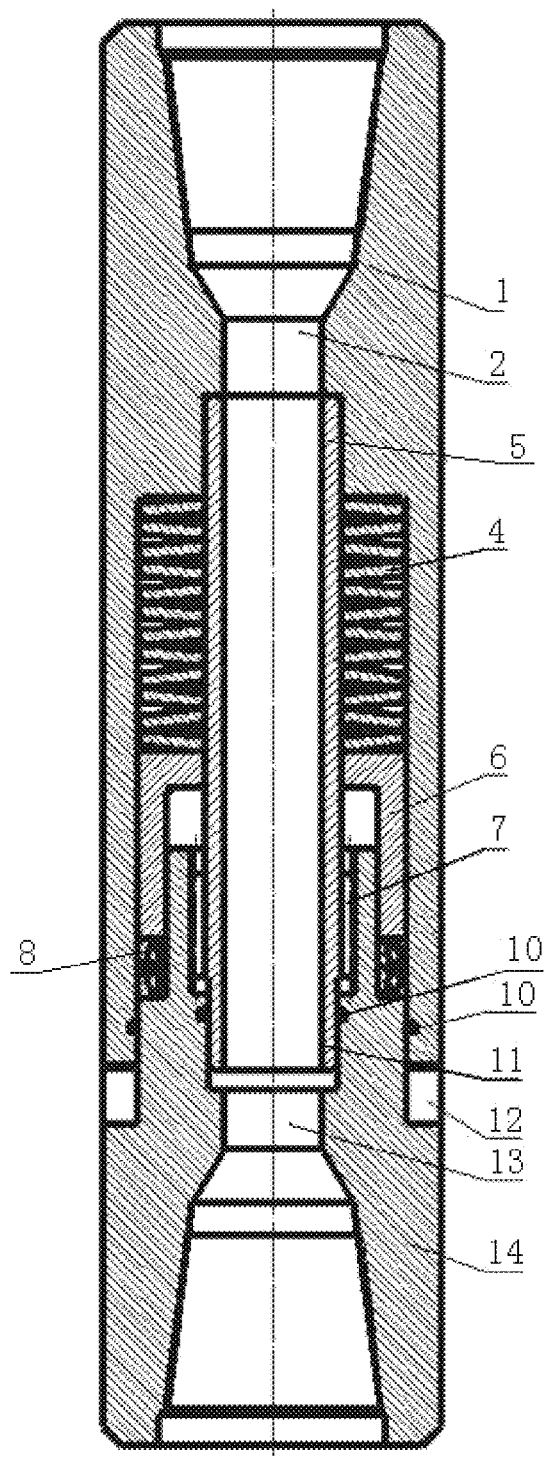
FIG. 1 is a schematic diagram of the structure of the invention.

The invention will be further explained below in conjunction with the figures: as shown in FIG. 1, a composite shocker absorber for a polycrystalline diamond compact bit includes a drilling tool body 1, an impact body 14, a disc spring group 4, a torsion bar spring 5 and an annular pressing sleeve 6, wherein bit vibration impact force is transmitted between the drilling tool body 1 and the impact body 14 through the torsion transmission join 12; the impact body 14 is arranged at the lower end of the drilling tool body 1 and forms a shock absorption cavity; and the disc spring group 4, the torsion bar spring 5 and the annular pressing sleeve 6 are arranged in the shock absorption cavity; the drilling tool body 1 is provided with a water inlet 2; the impact body 14 is provided with a water outlet 13; the water inlet 2, the inner cavity of the torsion bar spring 5 and the water outlet 13 define a fluid channel; the bit vibration impact force is transmitted between the drilling tool body 1 and the impact body 14 through the torsion transmission join 12; axial vibration absorption of the drilling tool is realized by the impact body 14 through the disc spring group 4; and vibration absorption in the torsion direction of the drilling tool is realized by the impact body 14 through the torsion bar spring 5.

Figure 2:
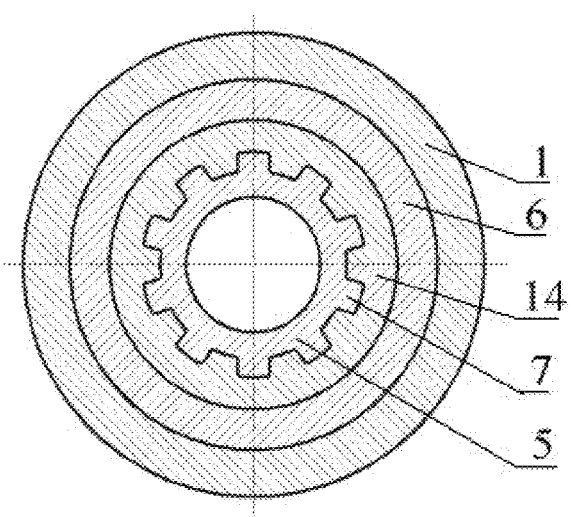
FIG. 2 is a sectional view of the connection between the torsion bar spring and the impact body key of the invention.
Figure 4:
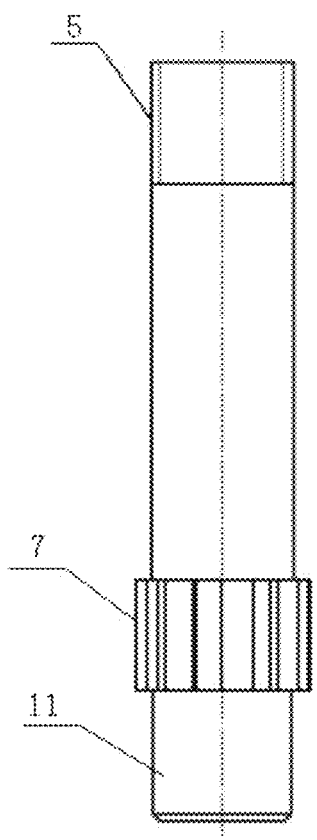
FIG. 4 is a schematic diagram of the torsion bar spring of the invention.
Figure 5:
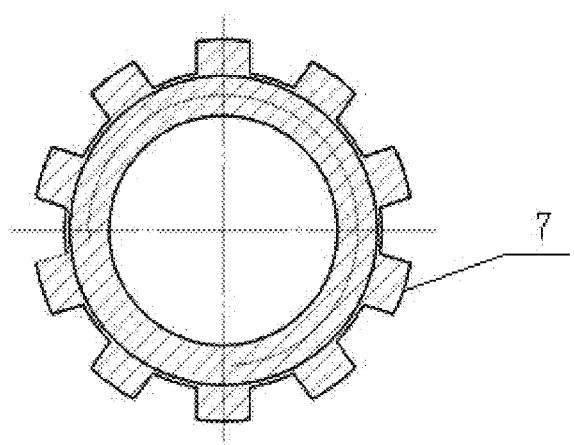
FIG. 5 is a side view of FIG. 4.

With the combination of FIG. 4 and FIG. 5, the torsion bar spring 5 is a cylindrical body, is provided with an external thread at the upper end, and is positioned in the shock absorption cavity; the upper end of the torsion bar spring 5 is in threaded connection to the drilling tool body 1; the lower part of the torsion bar spring 5 extends into an impactor; with the combination of FIG. 2, the lower part of the torsion bar spring 5 is provided with a spline 7 and a spline slot matched with the spline 7 is formed in the inner wall of the impact body 14; torsion transmission is realized through key connection between the torsion bar spring 5 and the impactor; the disc spring group 4 sleeves outside the torsion bar spring 5, and an annular pressing sleeve 6 is arranged at the lower end of the disc spring group 4; a bearing group 8 is arranged between the lower end surface of the annular pressing sleeve 6 and the annular step, in the drilling tool body 1, of the impact body 14, so that torsion is separated from movement in the axial direction; axial vibration of the impact body 14 is connected to the disc spring group 4 through the annular pressing sleeve 6 and the bearing group 8 to achieve axial vibration absorption. Meanwhile, decomposition of axial and radial motion of the bit is realized through the bearing group 8, and the vibration in the torsion direction of the impact body 14 is connected onto the torsion bar spring 5 through the spline 7 on the torsion bar spring 5 to achieve vibration absorption in the torsion direction.

A sealing ring 10 is arranged between the sealing shaft section 11 at the lower end of the torsion bar spring 5 and the inner wall of the impact body 14, and a sealing ring 10 is arranged between the outer wall of the impact body 14 and the drilling tool body 1 to achieve fluid sealing.

Figure 3:
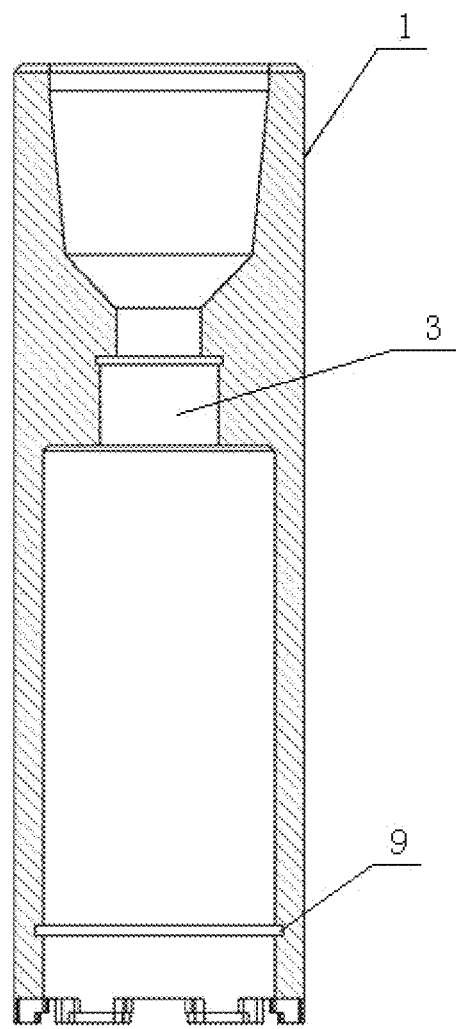
FIG. 3 is a schematic diagram of the drilling tool body of the invention.

Refer to FIG. 3, the drilling tool body 1 is a cylindrical body, and is provided with a water inlet 2 in the upper end, a threaded section 3, threads of which are internal threads for being in threaded connection to the torsion bar spring 5, is arranged under the water inlet 2; a shock absorption section is arranged under the threaded section 3, and an annular sealing slot 9 is formed in the inner wall of the shock absorption section.

Figure 6:
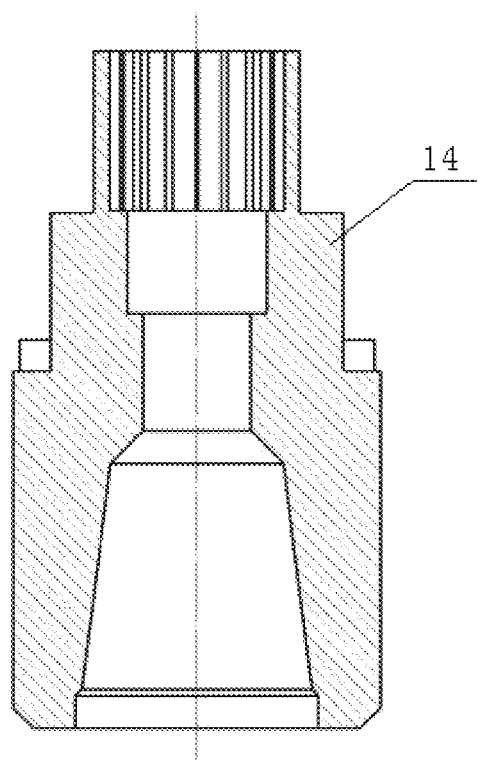
FIG. 6 is a schematic diagram of the impact body of the invention.

Refer to FIG. 6, the impact body 14 is a cylindrical body, a spline slot is formed in the outer wall of the upper end of the impact body 14, and a water outlet 13 is formed in the lower end of the impact body 14.

During mounting, the disc spring group 4 and the annular pressing sleeve 6 firstly sleeve the torsion bar spring 5, and the torsion bar spring 5 and the drilling tool body 1 are screwed and fixed through threads; the bearing group 8 is placed in the drilling tool body 1 for connecting the torsion bar spring 5 to the impact body 14 through the spline 7; and the bearing group 8 is arranged between the annular pressing sleeve 6 and the impact body 14.

In use, the drilling tool body 1 is connected to an upper bit, and the impact body 14 is connected to the bit, so that on one hand, axial vibration from the drill stem is absorbed, on the other hand, vibration impact in the torsion direction of the PDC bit is absorbed, and the damage of the slippage effect to PDC cutting teeth can be weakened.

What is claimed is:

1. A composite shock absorber for a polycrystalline diamond compact bit, comprising a drilling tool body (1) having a water inlet (2), an impact body (14) having a water outlet (13), the impact body is arranged at the lower end of the drilling tool body such that a shock absorption cavity is formed between the impact body and the drilling tool body, a disc spring group (4) which sleeves outside a torsion bar spring (5), the torsion bar spring having an annular pressing sleeve (6) surrounding a lower end thereof, the torsion bar spring (5) being located at least partially in the shock absorption cavity and comprising a cylindrical body with an external thread at an upper end and a spline (7) at the lower end thereof, the torsion bar spring being threaded to the drilling tool body (1) and extending into the impact body and connected thereto through the spline (7), the annular pressing sleeve (6) being located at a lower end of the disc sprig group (4), wherein bit vibration impact force is transmitted between the drilling tool body (1) and the impact body (14) through a torsion transmission joint, and a bearing group (8) is arranged between a lower end surface of the annular pressing sleeve (6) and an annular step of the impact body (14), the annular step located within the drilling tool body; wherein a sealing ring (10) is arranged between the lower end of the torsion bar spring (5) and an inner wall of the impact body (14), and a second sealing ring (10) is arranged between an outer wall of the impact body (14) and the drilling tool body (1).

2. The composite shock absorber for the polycrystalline diamond compact bit according to claim 1, wherein axial vibration of the impact body is transmitted to the disc spring group (4) through the annular pressing sleeve (6) and the bearing group (8) to achieve axial vibration absorption; and at the same time, torsional vibration of the impact body (14) is transferred to the torsion bar spring (5) by the spline (7) to achieve torsional vibration absorption.

3. The composite shock absorber for the polycrystalline diamond compact bit according to claim 2, wherein a spline slot matched with the spline (7) is formed in the inner wall of the impact body (14).

* * * * *